United States Patent [19]
Kagawa

[11] Patent Number: 5,239,340
[45] Date of Patent: Aug. 24, 1993

[54] LINEAR MOTOR DEVICE HAVING VIBRATION REDUCTION UNIT

[75] Inventor: Toshiaki Kagawa, Tenri, Japan

[73] Assignee: Sharp Kabushiki Kaisha, Osaka, Japan

[21] Appl. No.: 954,255

[22] Filed: Sep. 30, 1992

Related U.S. Application Data

[62] Division of Ser. No. 798,933, Nov. 27, 1991.

[30] Foreign Application Priority Data

Nov. 30, 1990 [JP] Japan .................................. 2-338736

[51] Int. Cl.⁵ .................... G03G 15/04; G03B 27/50; H02K 41/02
[52] U.S. Cl. ...................................... 355/236; 355/61
[58] Field of Search .................... 355/235, 236, 61; 310/12

[56] References Cited

U.S. PATENT DOCUMENTS 4,516,231  5/1985  Michaelis .
4,952,011  8/1990  Ishii et al. ........................... 355/61 Y
5,172,160  12/1992  Van Eijk et al. ................ 355/236 Y

FOREIGN PATENT DOCUMENTS

0333128A2  9/1989  European Pat. Off. .

Primary Examiner—Joan H. Pendegrass
Attorney, Agent, or Firm—David G. Conlin; George W. Neuner

[57] ABSTRACT

An improved linear motor device is disclosed having a vibration reduction unit. The linear motor device can be applied to a copying machine. As a magnetic field forming device receives reaction force and is moved, in the opposite direction to the movement of movable members, vibration is not transmitted to a base frame. The magnetic field forming device is carried to a most suitable position for absorbing the vibration by a driving device employing a pulse motor. A velocity reduction ratio in a velocity reduction mechanism of the driving device is set to be different from a velocity reduction ratio under an ideal condition in which frictional force is neglected. As a result, the magnet field forming device can be driven by a smaller pulse motor.

7 Claims, 5 Drawing Sheets

LINEAR MOTOR DEVICE HAVING VIBRATION REDUCTION UNIT

This is a divisional of copending application Ser. No. 07/798,933 filed Nov. 27, 1991.

CROSS-REFERENCE TO RELATED APPLICATIONS

This application is related to copending U.S. patent application Ser. No. 07/509,806, of particular interest, entitled "A LINEAR DRIVING APPARATUS", filed Apr. 17, 1990, and assigned to the same assignee of the present invention.

BACKGROUND OF THE INVENTION

1. Field of the Invention

The present invention relates generally to linear motor device and, more particularly, relates to an improved linear motor device having a vibration reduction unit. The present invention has particular applicability to copying machines.

2. Description of the Background Art

Linear motors have been widely used for various kinds of industrial equipment including electronic equipment requiring linear movement. While a linear motor can move a movable member to be carried in a quick and precise manner, vibration is caused by the movement. If the vibration is transmitted to another components within the equipment employing the linear motor, in some cases, a malfunction or a problem is caused to the components. Particularly, as electronic equipment such as a copying machine and optical or magnetic disc apparatus employing a linear motor encounters a serious problem caused by the vibration, various measures are taken in order to prevent or reduce the vibration.

For example, in optical or magnetic disc apparatus, a movable unit including a voice coil is mounted on a rectilinearly movable member and a magnetic field forming member including permanent magnet is fixed on a base frame. When the movable member is moved, the voice coil is driven and a thrust is caused at the movable unit. The magnetic field forming member receives reaction force corresponding to the thrust and the reaction force is transmitted to the base frame. As a result, vibration is caused in the base frame or, in some cases, the shape of the base frame is changed, which often causes malfunction in data access, i.e., data reading/writing in the optical or magnetic disc apparatus.

While the present invention is applicable to various kinds of equipment including a copying machine and optical or magnetic disc apparatus employing a linear motor, a description will be made of one example where the present invention is applied to a copying machine in the following.

FIG. 1 is a block diagram of a conventional copying machine. Referring to FIG. 1, the copying machine includes two movable members 10a and 10b which move linearly along an original document surface 64. There are provided on movable member 10a a halogen lamp 102 for directing light for reading out an image onto the original document and a reflecting mirror 101 for reflecting the reflected light from the original document. Two reflecting mirrors 103 and 104 are provided on movable member 10b, for reflecting light directed from reflecting mirror 101. The light reflected by reflecting mirror 104 is given to a reflecting mirror 66 through a zoom lens 65. The light reflected by reflecting mirror 66 is irradiated on a photoreceptor drum 67. It is noted that reflecting mirrors 101, 103, 104 and 66 are provided for changing the light path of the light supplied from the original document.

A developing unit 69 supplies toner to photoreceptor drum 67 according to the light directed on photoreceptor drum 67. Accordingly, a toner image 70 is formed on photoreceptor drum 67 and the toner image is transferred onto a recording paper 72, which is prepared in advance, by a transfer unit 71. The transferred image is fixed on recording paper 72 by a fixing unit 73. A discharging unit 74 eliminates electric charge left on photoreceptor drum 67. A cleaner 75 is provided for removing the toner left on photoreceptor drum 67. The surface of photoreceptor drum 67 is restored to its initial state by a charging unit 68.

FIG. 3 is a plan view of a copying machine representing the background of the present invention. The copying machine shown in FIG. 3 has been already proposed in the earlier application by the applicant of the present invention. Referring to FIG. 3, the copying machine includes a base frame 1, a magnetic field forming device 36 movable in the lateral direction, that is, the directions A and B, and movable members 10a and 10b each capable of moving independently from each other in the lateral direction. Movable members 10a and 10b correspond to movable members 10a and 10b shown in FIG. 1, respectively. Accordingly, movable member 10a shown in FIG. 3 includes a halogen lamp 102 and a reflecting mirror 101 (not shown). Movable member 10b also includes reflecting mirrors 103 and 104 (not shown). It is noted that these movable members 10a and 10b are moved with the velocity ratio of 2:1 in order to keep constant the light path length of the light reflected from the original document. Movable members 10a and 10b move in the direction B in the return operation after moving in the direction A in the scanning operation.

Two holders 2 are attached on base frame 1 and a rail 3 is held by holders 2. Movable member 10a moves along rail 3 through a bearing 11a. Movable member 10b also moves along rail 3 through a bearing 11b.

Movable units 20a are provided on both ends of movable member 10a. Similarly, movable units 20b are provided on both ends of movable member 10b. Magnetic field forming members 30a and 30b facing movable units 20a and 20b are provided within a magnetic field forming device 36. Linear encoders 13a and 13b are formed on movable members 10a and 10b, respectively. A stator scale 13c is attached on base frame 1 through two fixed members 5. Linear encoders 13a and 13b detect the present positions of movable members 10a and 10b on stator scale 13c.

Magnetic field forming member 30a includes a plate-like permanent magnet 32a and a fixed yoke 31a. Similarly, magnetic field forming member 30b includes a plate-like permanent magnet 32b and fixed yoke 31b. Magnetic field forming members 30a and 30b are coupled to each other by connecting plates 33 and 34. Accordingly magnetic field forming device 36 is formed of magnetic field forming members 30a, 30b and connecting plates 33, 34. Two bearings 35 for supporting guide rail 3 is provided inside magnetic field forming member 30a.

FIG. 2 is a structural cross-sectional view taken along the line V—V in FIG. 3. Referring to FIG. 2, a rail 4 is attached at the upper side of base frame 1 and a roller 12a runs on rail 4. Movable member 10a is connected to roller 12a by a connecting member 22a. A total of two rollers 6 are provided under magnetic field forming member 30b and on base frame 1, so that magnetic field forming device 36 can move in either direction A or B on base frame 1.

Movable unit 20a includes movable yokes 21a and 22a attached on both sides of movable member 10a and two three-phase coils 23a attached outside of movable yokes 21a and 22a. A three-phase brushless linear motor is made up of the two three-phase coils 23a and permanent magnets 32a and 32b facing three-phase coils 23a and formed inside fixed yokes 31a and 31b. Hall elements (not shown) are provided at predetermined positions on movable yokes 21a and 22a for detecting a timing for magnetization switching of three-phase coils 23a. The hall elements detect the change of magnetic fluxes of permanent magnets 32a, 32b. Similarly, another three-phase brushless linear motor is made up of two movable units 20b and magnetic field forming members 30a and 30b.

Referring back to FIG. 3, struts 41a and 41b are provided outside of fixed yoke 31a of magnetic field forming device 36. FIG. 4 is a structural cross-sectional view taken along the line W—W in FIG. 3. Struts 41a and 41b extend through two holes 42a and 42b formed in the side surface of the base frame. A pulley 45 on which a wire 43 having a predetermined tension is wound is provided between struts 41a and 41b and outside of base frame 1. Pulley 45, along with a timing pulley 46, is provided inside a gear box 47 attached outside of base frame 1. Pulley 45 and timing pulley 46 are connected to each other through a timing belt 48. A pulse motor 49 is provided outside of gear box 47 and a rotation shaft of pulse motor 49 is connected to timing pulley 46. As a result, magnetic field forming device 36 can be moved by driving pulse motor 49. In other words, wire 43, pulley 45, timing pulley 46, timing belt 48 and pulse motor 49 constitute a driving device 40 for driving magnetic field forming device 36.

Timing pulley 46 is rotated by driving pulse motor 49. As timing belt 48 transmits the rotation of timing pulley 46 to pulley 45, the rotating velocity of pulley 45 is changed with a predetermined reduction gear ratio or velocity reduction ratio. The rotation of pulley 45 transmits its power to magnetic field forming device 36 through wire 43 and struts 41a and 41b. Accordingly, magnetic field forming device 36 is moved in the direction A or B in base frame 1. The detail of driving device 40 in FIG. 3 is shown in FIG. 6.

FIG. 5 is a block diagram of a motor control circuit 50 and a motor driving circuit 60 for controlling and driving pulse motor 49 shown in FIG. 3. Referring to FIG. 5, there are provided in movable member 10a three-phase coil 23a as an armature winding, and linear encoder 13a for detecting the position of movable member 10a. Similarly, three-phase coil 23b and linear encoder 13b are provided in movable member 10b. Each positional detection signal supplied by linear encoders 13a and 13b includes two rectangular wave signals having a phase difference of 90° each other and a home position detection signal. The positional detection signal is supplied to a microprocessor (MPU) 51 through waveform shapers 51a and 51b, and the present positions and moving velocities of movable members 10a and 10b are obtained in microprocessor 51.

Microprocessor 51 includes a memory (not shown) in which the movement positional data and velocity data of movable members 10a and 10b are stored in advance.

Microprocessor 51 compares the stored positional data with the present positional data detected and supplies a three-phase driving signal for driving the linear motors to three-phase drivers 52a and 52b based on the result of the comparison. Three-phase drivers 52a and 52b supply three-phase driving signals for driving three-phase coils 23a and 23b in response to the driving signal supplied from microprocessor 51.

That is, motor control circuit 50 receives the positional detection signals supplied from linear encoders 13a and 13b as feedback signals and controls the positions and velocities of two linear motors independently from each other.

Motor driving circuit 60 includes an input selection switch 61, a logic circuit 62 and a four-phase current driver circuit 63. A count up pulse Up and a count down pulse Dn are supplied to one input S of switch 61 from motor control circuit 50. A count up pulse Upi and a count down pulse Dni in the initial state are provided to the other terminal I of switch 61.

When the power supply is turned on, switch 61 is connected to terminal I and magnetic field forming device 36 is moved to a position defined by the initializing signals Upi and Dni. As switch 61 is connected to terminal S after the initialization is completed, the count up pulse Up and the count down pulse Dn indicating the position of movable member 10a are supplied to logic circuit 62 through switch 61. A predetermined logic processing is carried out in logic circuit 62 and an output signal therefrom is supplied to four phase current driver circuit 63. Four phase current driver circuit 63 supplies driving currents of four phases to pulse motor 49 so that magnetic field forming device 36 is moved.

Movable members 10a and 10b are moved with the velocity ratio of 2:1 as stated above. The changes in the velocities Va and Vb of movable members 10a and 10b are shown in FIG. 7A. In FIG. 7A, the axis of abscissas represents the passage of time t and the axis of ordinates represents velocity V.

As movable members 10a and 10b are moved according to the velocity patterns shown in FIG. 7, the respective positions Xa and Xb of movable members 10a and 10b change as shown in FIG. 7B. In FIG. 7B, the axis of ordinates represents a distance X of movement with the direction A shown in FIG. 3 being positive.

As shown in FIGS. 7A and 7B, when the original document is scanned, the two movable members 10a and 10b are moved according to the velocity patterns and positional patterns shown in FIGS. 7A and 7B (the data is stored in the memory within microprocessor 51). The propulsion force for moving movable members 10a and 10b is obtained by the linear motors which have already been described. That is, as shown in FIG. 2, movable member 10a obtains the propulsion force from the two linear motors including magnetic field forming members 30a and 30b and three-phase coils 23a. Similarly, movable member 10b also receives another propulsion force. As movable members 10a and 10b receive the propulsion force from magnetic field forming members 30a and 30b through electromagnetic coupling, magnetic field forming members 30a and 30b also receive reaction forces from the two movable members 10a and 10b. Though the magnitudes of the reaction forces are the same as those of movable members 10a and 10b, they are applied in the opposite direction. Accordingly, magnetic field forming device 36 is moved by the reaction force.

FIG. 7C indicates a distance Y of movement of magnetic field forming device 36. The positive direction of movement of magnetic field forming device 36 in FIG. 7C is opposite to that of movable members 10a and 10b in FIG. 7B. As movable members 10a and 10b move in the scanning direction A in the scanning period Ts, magnetic field forming device 36 moves in the opposite direction B in this period. Conversely, as movable members 10a and 10b move in the direction B in the return period Tr, magnetic field forming device 36 is moved in the direction A by the reaction force. As a result, the reaction force Fr caused by the movement of movable members 10a and 10b is not transmitted to base frame 1, so that the vibration caused by the movement of movable members 10a and 10b is not transmitted to base frame 1.

A curved line Y1 shown in FIG. 7C is obtained assuming that there is no frictional force $F\mu$ in the movement of magnetic field forming device 36. Actually, as frictional force $F\mu$ ($>0$) is caused between magnetic field forming device 36 and base frame 1 with the movement, magnetic field forming device 36 is moved according to the curved line Y2 in FIG. 7C. That is, as there is frictional force $F\mu$, which is not negligible, between magnetic field forming device 36 and base frame 1, magnetic field forming device 36 can not be returned to its original position only by the reaction force from movable members 10a and 10b.

Supposing that the propulsion forces of movable members 10a and 10b are Fa (t) and Fb (t), and frictional forces of movable members 10a and 10b and magnetic field forming device 36 are $F\mu a$, $F\mu b$ and $F\mu m$, respectively, forces F1 (t), F2 (t) and Fm (t) acting on movable members 10a and 10b and magnetic field forming device 36 are obtained in accordance with the following equations:

$$F1(t) = Fa(t) - F\mu a \quad (1)$$

$$F2(t) = Fb(t) - F\mu b \quad (2)$$

$$Fr(t) = Fa(t) + Fb(t) \quad (3)$$

$$Fm(t) = -Fr(t) - F\mu m \quad (4)$$
$$= -(F1(t) + F2(t))$$
$$- (F\mu a + F\mu b - F\mu m). \quad (5)$$

In this case, if $F\mu a + F\mu b - F\mu m$ is defined as a friction load loss $F\mu$, the following relation holds true, so that the relation of $F\mu > 0$ is obtained as movable members 10a and 10b are supported by plain bearings while magnetic field forming device 36 is supported by a ball-and-roller bearing:

$$F\mu a + F\mu b > F\mu m \quad (6)$$

The velocity reduction ratio of the velocity reduction mechanism of pulse motor 49 shown in FIG. 6 is so adapted that the load of pulse motor 49 is 0 under the ideal condition ($F\mu = 0$). Supposing that x is the velocity reduction ratio of the velocity reduction mechanism and r is the radius of wire pulley 45, the torque T generated at the rotation shaft of pulse motor 49 is expressed by the following equation:

$$T = (1/x) \cdot r \cdot F\mu \quad (7)$$

If $F\mu = 0$, the electrical angle of a field winding in pulse motor 49 always coincides with the rotor rotation angle of pulse motor 49 to which wire 43, pulley 45 and so on are coupled, so that no rotating force is caused in the rotor of pulse motor 49. That is, pulse motor 49 is operated under a no-load condition.

Conversely, if there is friction load loss $F\mu$, the electrical angle of the field winding of pulse motor 49 does not coincide with the rotor rotation angle of pulse motor 49, so that rotating force is generated in the rotor of pulse motor 49 in such a direction that the difference therebetween is reduced. The rotating force is transmitted to magnetic field forming device 36 through wire 43, pulley 45 and so on, so that magnetic field forming device 36 is controlled in the same way as in the case where $F\mu = 0$. Accordingly, also in the case where $F\mu > 0$, magnetic field forming device 36 is returned to the exact, initial position after the scanning operation as indicated by the curved line Y3 shown in FIG. 8A.

In this way, magnetic field forming device 36 is always moved to a desired position by the action of pulse motor 49 in the copying machine shown in FIG. 3. The following problems, however, are pointed out. That is, as the friction load loss $F\mu$ becomes larger, a larger output torque is required for pulse motor 49. If the friction load loss $F\mu$ is excessively larger than the maximum output torque of pulse motor 49 ($F\mu >> 0$), a step-out is caused in pulse motor 49. As the driving frequency of pulse motor 49 changes as shown in FIG. 8B, the step-out is likely to be caused particularly in the latter half period Td in the return period. If the step-out is caused in pulse motor 49, magnetic field forming device 36 is not returned to the desired initial position as indicated by the broken line Y3' in FIG. 8A. As a result, in the next scanning operation, a problem is caused such as a collision of movable members 10a and 10b with bearings 35 or a collision of connecting plates 33 and 34 with holders 2.

In order to prevent the step-out of pulse motor 49, it is necessary to use, as motor 49, a pulse motor having a larger maximum output torque. A pulse motor having a larger output torque, however, is generally large, so that the size and cost of the copying machine is inevitably increased.

SUMMARY OF THE INVENTION

An object of the present invention is to miniaturize a driving device for driving a vibration reduction unit in a linear motor device including the vibration reduction unit.

Another object of the present invention is to prevent false movement of a vibration reduction unit in a linear motor device including the vibration reduction unit without increasing the device size.

Still another object of the present invention is to miniaturize a driving device for driving a vibration reduction unit in a copying machine including the vibration reduction unit.

Yet another object of the present invention is to prevent false movement of a vibration reduction unit in a copying machine including the vibration reduction unit without increasing the device size.

In short, a linear motor device according to the present invention includes a linearly movable member which is moved linearly, an armature winding formed on the linearly movable member, a vibration reduction unit which is moved in an opposite direction to that of the movement of the linearly movable member, for reducing vibration caused by the movement of the linearly movable member, a magnetic field device formed on the vibration reduction unit and coupled to the armature winding through a magnetic field, a driving device for driving the vibration reduction unit and the magnetic field device in the opposite direction to that of the movement of the linearly movable member under an ideal condition in which frictional force is neglected, and an electromagnetic coupling reduction means for reducing electromagnetic coupling between the armature winding and the magnetic field device.

In operation, as the electromagnetic coupling reduction means reduces electromagnetic coupling between the armature winding and the magnetic field device, the output required for the driving device is reduced.

In accordance with another aspect of the present invention, a copying machine includes a light source for applying light for reading an image onto an original document, first and second reflecting units for changing the light path of a reflected light from the original document, and a transfer device responsive to the reflected light transmitted through the first and second reflecting units for transferring a read out image onto a recording medium which is prepared in advance. The first and second reflecting units are moved independently and linearly in parallel to the original document so as to keep the light path length of the reflected light at a fixed value. The copying machine further includes first and second armature windings formed on the first and second reflecting units, respectively, a vibration reduction unit which is moved in the opposite direction to that of the movement of the first and second reflecting units, for reducing vibration caused by the movement of the first and second reflecting units, a magnetic field device formed on the vibration reduction unit and coupled to the first and second armature windings through the magnetic field, a driving device for driving the vibration reduction unit and the magnetic field device in the opposite direction to that of the movement of the first and second reflecting units under an ideal condition in which frictional force is neglected, and electromagnetic coupling reduction means for reducing electromagnetic coupling between the first and second armature windings and the magnetic field device.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
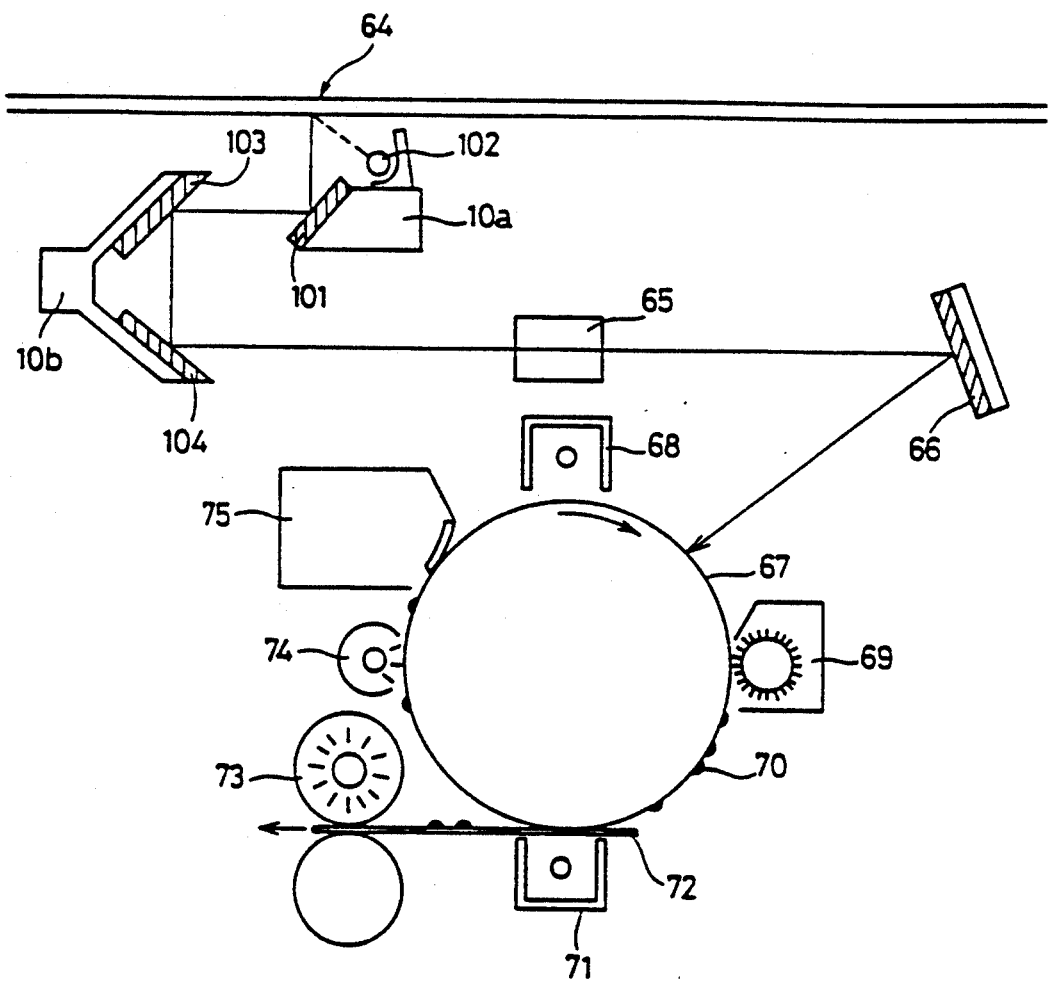
FIG. 1 is a block diagram of a conventional copying machine.
Figure 2:
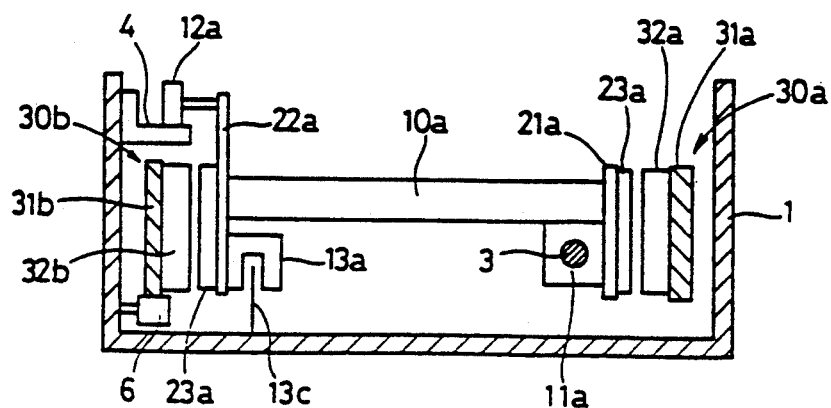
FIG. 2 is a structural cross-sectional view taken along a line 2—2 in FIG. 3.
Figure 3:
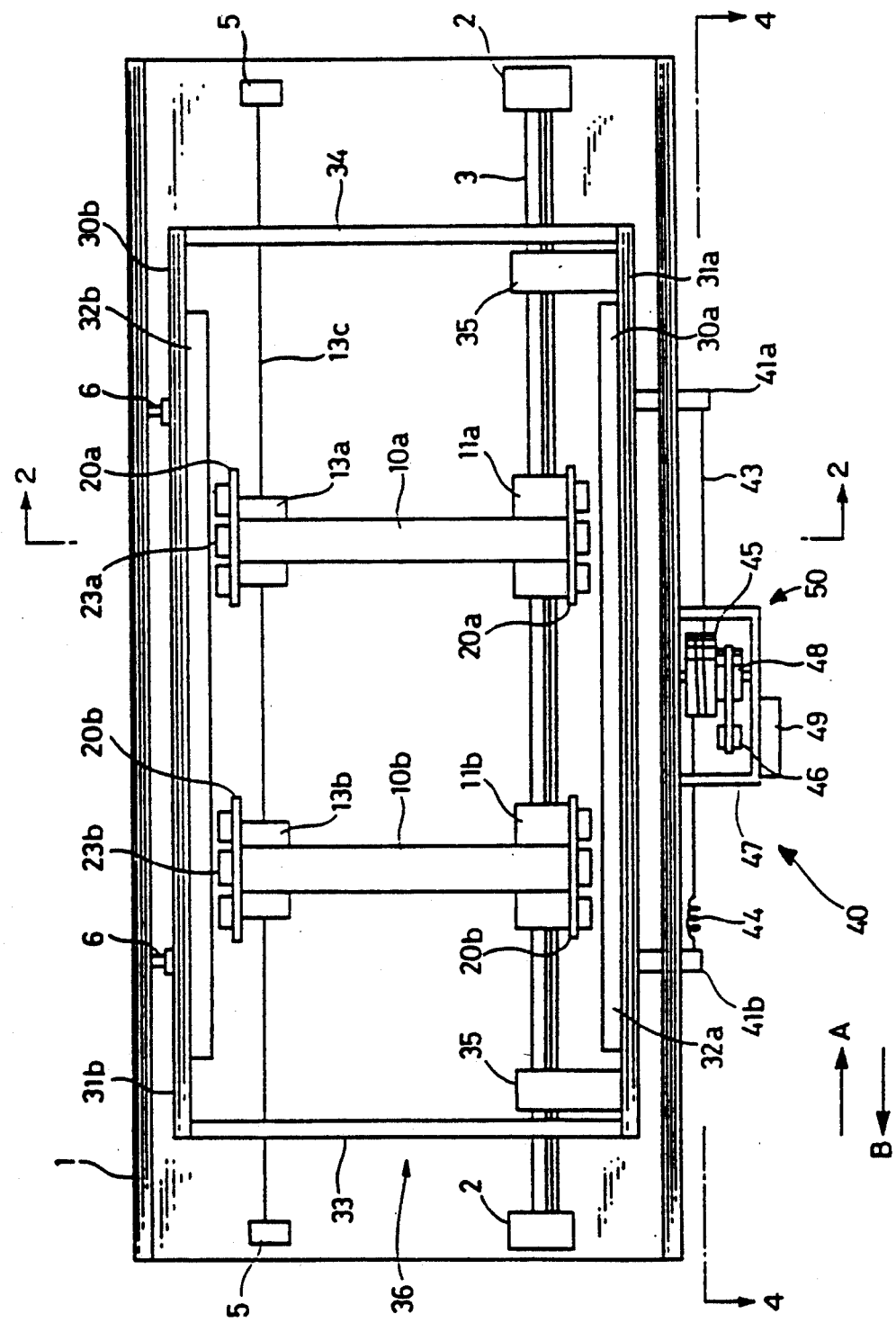
FIG. 3 is a plan view of a copying machine representing the background of the invention.
Figure 4:
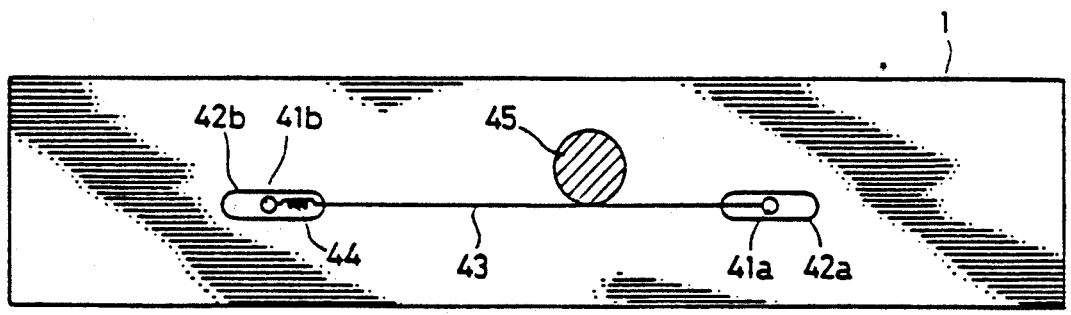
FIG. 4 is a structural cross-sectional view taken along the line 4—4 FIG. 3.
Figure 5:
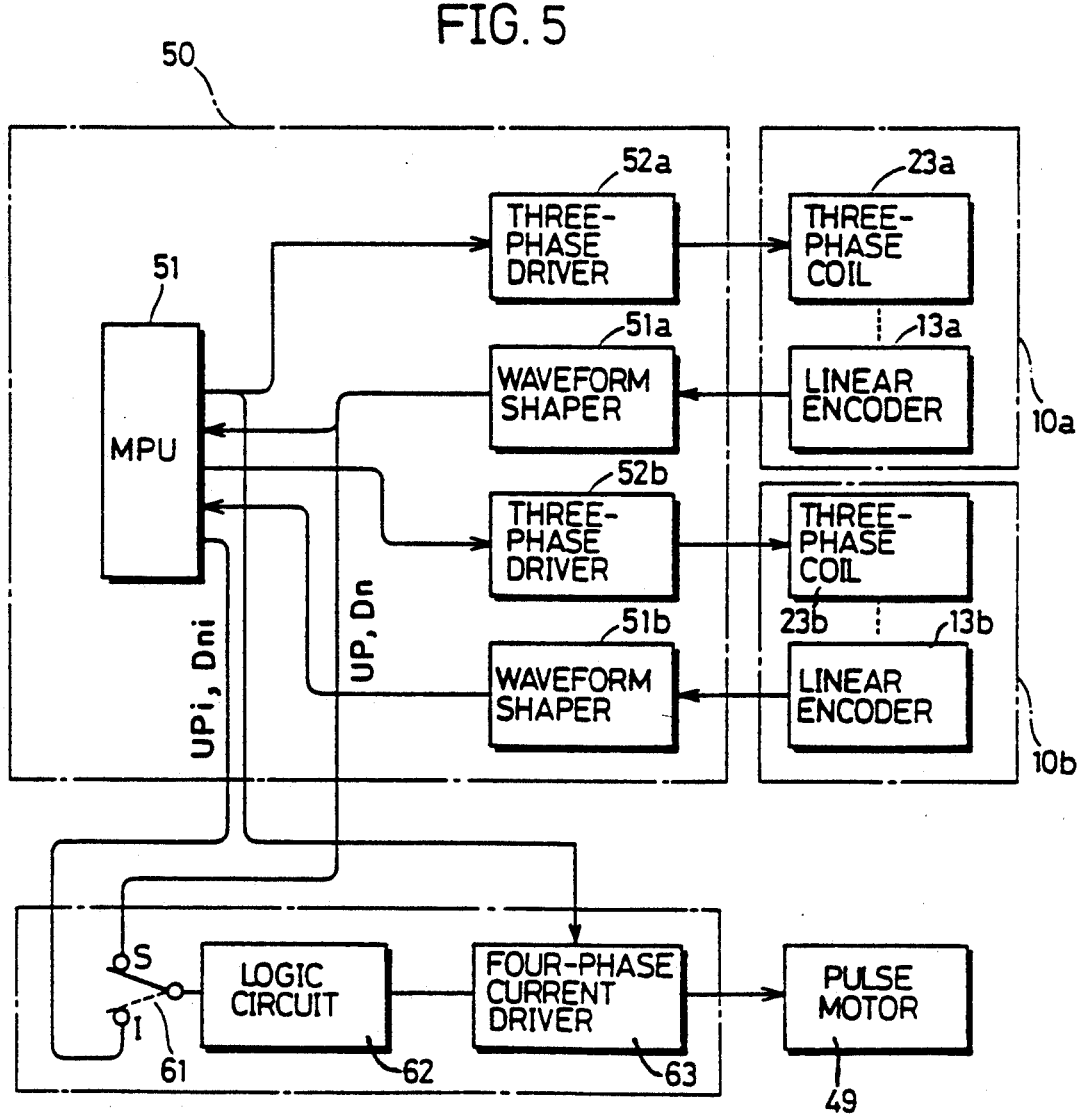
FIG. 5 is a block diagram of a motor control circuit for controlling and driving the pulse motor shown in FIG. 3.
Figure 6:
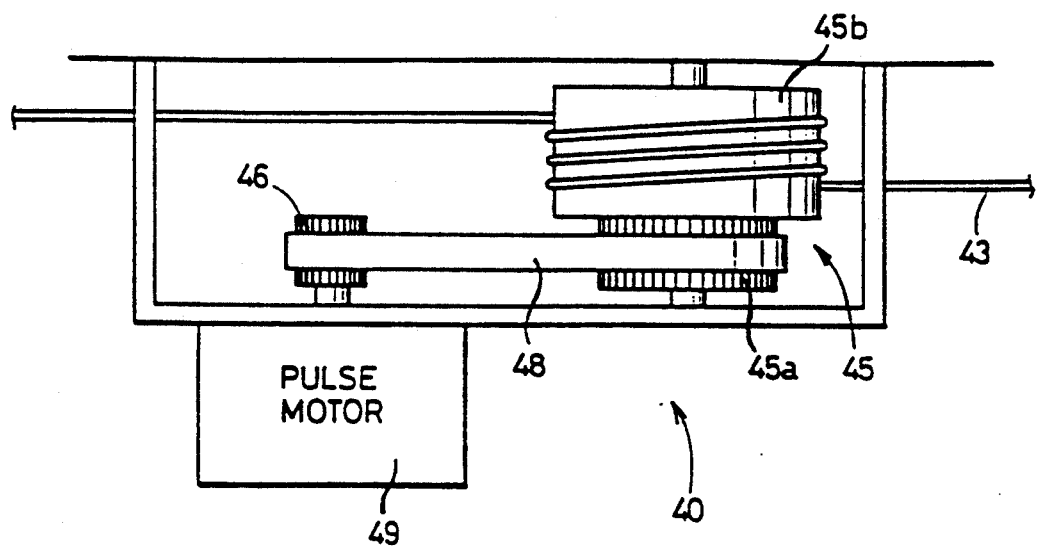
FIG. 6 is a structural drawing showing the structure of the driving device shown in FIG. 3.
Figure 7A:
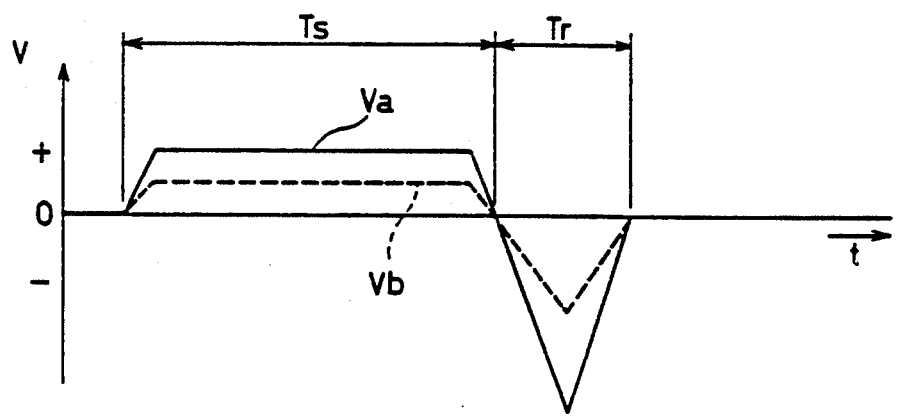
FIG. 7A is a velocity change diagram showing changes in velocities of movement of two movable members.
Figure 7B:
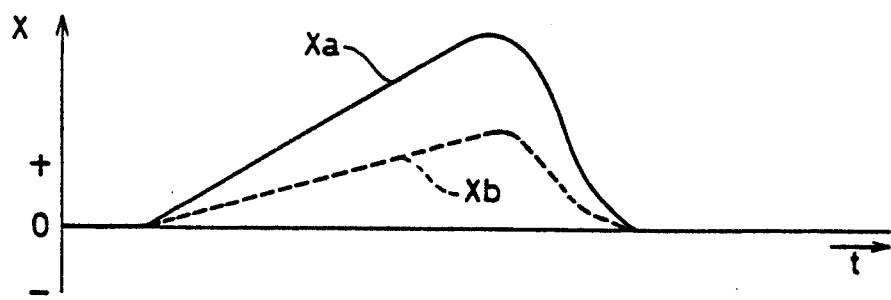
FIG. 7B is a movement change diagram showing changes in movement of the two movable members.
Figure 7C:
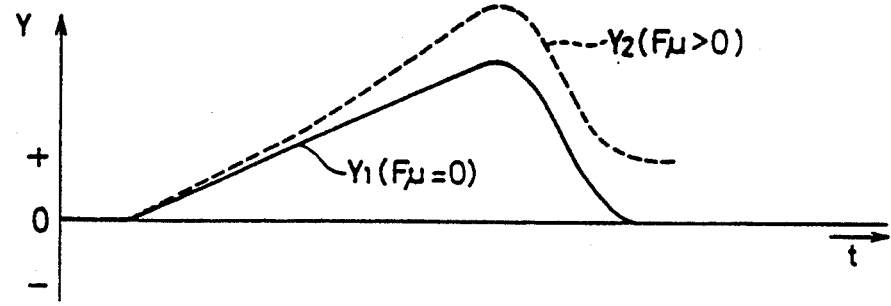
FIG. 7C is a movement change diagram showing the change of movement of a magnetic field forming device which changes depending on whether there is a friction load loss.
Figure 8A:
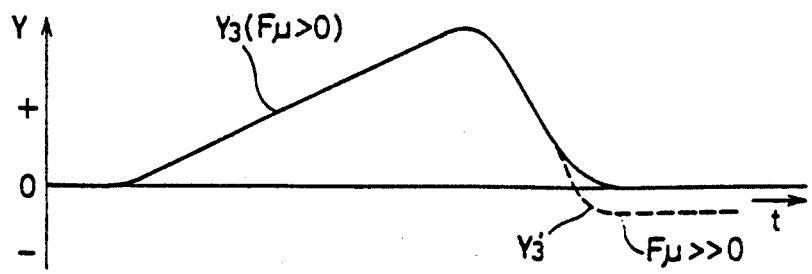
FIG. 8A is a movement change diagram showing the change of movement of the magnetic field forming device in a case where a driving device is provided.
Figure 8B:
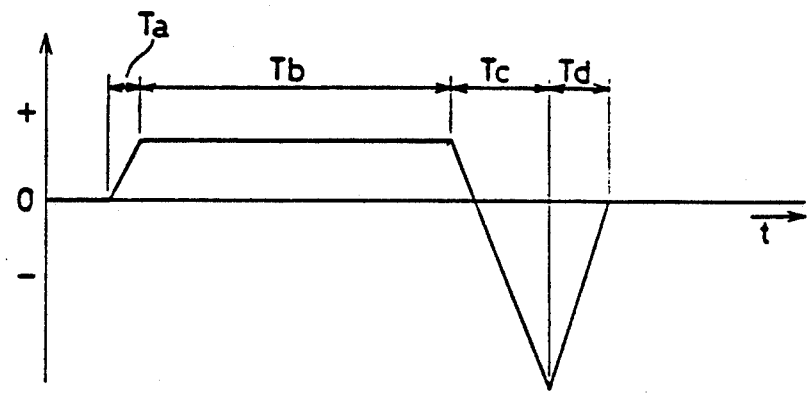
FIG. 8B is a frequency change diagram showing the change in the driving frequency of a pulse motor in the driving device.
Figure 9A:
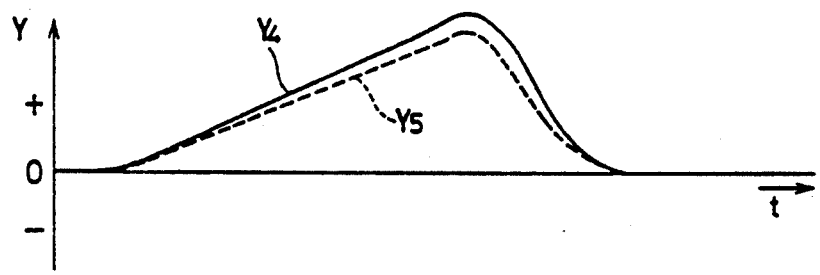
FIG. 9A is a movement change diagram showing the change of movement of a magnetic field forming device in accordance with one embodiment of the present invention.

In a preferred embodiment, the velocity reduction ratio of a velocity reduction mechanism in the driving device shown in FIG. 6 is changed as described below in detail. That is, the velocity reduction ratio x under the ideal condition (F$\mu$=0) is changed and a new velocity reduction ratio x' is set. The value of the new velocity reduction ratio x' is set to be slightly larger or smaller than the velocity reduction ratio x under the ideal condition. As a result, the movement of magnetic field forming device 36 is changed with the new velocity reduction ratio x' as indicated by the broken line Y5 in FIG. 9A. The solid line Y4 in FIG. 9A represents for reference the change in the movement of magnetic field forming device 36 in the case where the ideal velocity reduction ratio x is set. In the example shown in FIG. 9A, the new velocity reduction ratio x' is set to be slightly larger than the ideal velocity reduction ratio x. As seen from FIG. 9A, the distance Y5 of movement of magnetic field forming device 36 is slightly reduced with the new velocity reduction ratio x' compared with the distance Y4 of movement with the ideal velocity reduction ratio x.

Assuming that the mass of magnetic field forming device 36 is M, and the acceleration of magnetic field forming device 36 with the velocity reduction ratio x is $\alpha(t)$, the acceleration $\alpha'(t)$ with the velocity reduction ratio x' is obtained according to the following equation:

$$\alpha'(t)=(x/x')\cdot\alpha(t) \tag{8}$$

Accordingly, force exerted on magnetic field forming device 36 with the new velocity reduction ratio x' is excessively changed by $\Delta F$ represented by the following equation, compared with the value with the velocity reduction ratio x:

$$\Delta F=M\cdot\alpha(t)-M\cdot\alpha'(t)=\{(x'-x)/x'\}M\cdot\alpha(t) \tag{9}$$

Figure 9B:
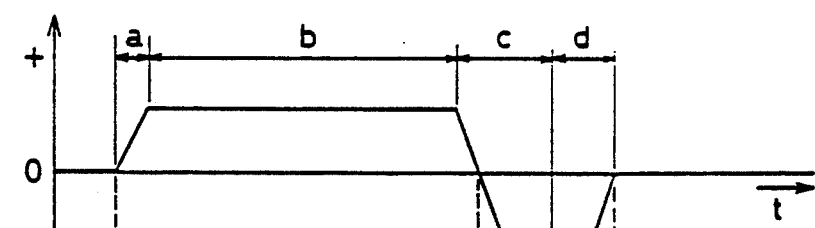
FIG. 9B is a frequency change diagram showing the change in the driving frequency of a pulse motor in accordance with one embodiment of the present invention.

As the force $\Delta F$ acts in the opposite direction to that of the friction load loss F$\mu$ in the latter half period Td in the return period (see FIG. 9B), the torque T' applied on the rotation shaft of pulse motor 49 is expressed by the following equation:

$$T = (1/x') \cdot r \cdot (F\mu - \Delta F) \quad (10).$$

Figure 9C:
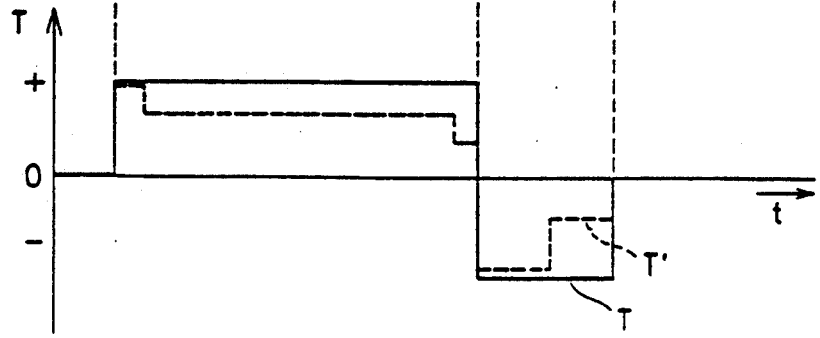
FIG. 9C is a torque change diagram showing the change in the output torque of the pulse motor in accordance with one embodiment of the present invention.

As a result, the load of the rotation shaft of pulse motor 49 can be reduced as indicated by the broken line T' in FIG. 9C. This means that the step-out is prevented even if a pulse motor with a smaller output torque is used as pulse motor 49 of driving device 40. Accordingly, magnetic field forming device 36 can be driven by a smaller pulse motor and returned to the exact, initial position.

A detailed description will be made below of a range in which the new velocity reduction ratio x' is set. At first, a description will be made of the ideal condition, that is, an ideal velocity reduction ratio x in the case where there is no friction load loss $F\mu$. Suppose that the velocities of movable members 10a and 10b and magnetic field forming device 36 are Va, Vb and Vm, respectively. Also, suppose that the respective masses of movable members 10a and 10b and magnetic field forming device 36 are Ma, Mb and Mm. Vm is expressed by the following equation under the ideal condition ($F\mu = 0$):

$$\begin{aligned} Vm &= -(Ma \cdot Va + Mb \cdot Vb)/Mm \\ &= -(Ma + Mb/2) \cdot Va/Mm \end{aligned} \quad (11)$$

$(\because Vb = Va/2).$

The velocity reduction ratio x is expressed by the following equation:

$$x = |Va/Vm| = Mm/(Ma + Mb/2) \quad (12).$$

In addition, the following variables are given for driving device 40 shown in FIG. 6:

$\theta$; a rotation angle (radian) of pulse motor 49 with respect to the distance of movement of movable member 10a;

Z1; the number of teeth of timing pulley 46;

Z2; the number of teeth of timing pulley 45a;

Dp; a diameter of wire pulley 45b; and

Dw; a diameter of wire 43.

Accordingly, the velocity reduction ratio x is expressed by the following equation:

$$x = \{\theta \cdot (Z1/Z2) \cdot (Dp + Dw)/2\}^{-1} \quad (13).$$

If Ma = 1.8 (kg), Mb = 2.4 (kg), and Mm = 15 (kg) are given as actual data, the velocity reduction ratio x under the ideal condition is obtained according to the expression (12) as indicated by the following equation:

$$x = 15/(1.8 + 2.4/2) = 5 \quad (14).$$

Therefore, in the copying machine representing the background of the invention, the velocity reduction mechanism shown in FIG. 6 was designed to obtain x = 5 with $F\mu = 0$ as follows: $\theta = \pi/90$ (rad / mm), Z1 = 20, Z2 = 60, Dp = 33.4 (mm), Dw = 1.0 (mm).

In a preferred embodiment, the variables included in the expression (13) can be changed in order to set a new velocity reduction ratio x'. For example, if the number Z1 of teeth of timing pulley 46 is set at 18, x' = 5.56 is obtained. In another case, if the number Z2 of teeth of timing pulley 45a is set at 67, x' = 5.58 is obtained. In still another case, if the diameter Dp of wire pulley 45b is set at 30 (mm) x' = 5.54 is obtained. The new velocity reduction ratio x' can be changed by not only modifying just one variable as stated above but by modifying two or more variables included in the expression (13).

A description will now be made of a permissible range in which a new velocity reduction ratio x' is set. In an experiment, it was observed whether there was step-out of the pulse motor and the magnitude of vibration transmitted to base frame 1 was measured according to several kinds of velocity reduction ratios x' obtained by changing the number Z1 of teeth of timing pulley 46 to several values. The result of the measurement is shown in the following table 1.

TABLE 1

| Number Z1 of teeth of timing pulley 46 | Velocity reduction ratio x' | Step-out of pulse motor 49 | Vibration of Base frame 1 (mm) |
|---|---|---|---|
| 16 | 6.25 | not observed | 0.16 |
| 17 | 5.88 | not observed | 0.13 |
| 18 | 5.56 | not observed | 0.11 |
| 19 | 5.26 | observed | 0.098 |
| 20 | 5 | observed | 0.092 |

A seen from the result of the experiment shown in Table 1, if the value of the velocity reduction ratio x' is set larger, the step-out of pulse motor 49 is prevented and vibration of base frame 1 increased. That is, setting a larger velocity reduction ratio x' lowers the capability of absorbing the reaction force by magnetic field forming device 36 and increases the vibration transmitted to base frame 1. In view of the result of the experiment above, the velocity reduction ratio x' is set at such a value that a step-out is not caused in pulse motor 49 within a range where the vibration of base frame 1 is permissible, for example, x' = 5.56 (Z1 = 18). The vibration (displacement) of base frame 1 is 0.11 (mm) with x' = 5.56, which is sufficiently small compared with the vibration (= 5.56 mm) of base frame in a case where there is no mechanism provided for reducing the reaction force. In other words, the reduction of the function of absorbing the reaction force with x' = 5.56 is not actually a serious problem.

As stated above, vibration caused by movable members 10a and 10b can be reduced or absorbed without using a large pulse motor by changing the velocity reduction ratio of the velocity reduction mechanism in driving device 40 shown in FIG. 6 to the value x' slightly larger or smaller than the value x under the ideal condition ($F\mu = 0$). In other words, driving device 40 for driving a vibration absorbing unit, i.e., magnetic field forming device 36 can be miniaturized without causing false movement of a vibration reduction unit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A copying machine, comprising:

light applying means for applying a light for reading an image onto an original document;

first and second reflecting unit means for changing the light path of a reflected light from said original document;

transfer means responsive to a reflected light transmitted through said first and second reflecting unit means for transferring a read image onto a recording medium which is prepared in advance, each said first and second reflecting unit means being moved independently and linearly in parallel to said original document so as to keep the light path length of said reflected light at a predetermined value;

first and second armature winding means formed on said first and second reflecting unit means, respectively;

vibration reduction means which is moved in the opposite direction to the movement of said first and second reflecting unit means, for reducing vibration caused by the movement of said first and second reflecting unit means;

magnetic field means formed on said vibration reduction means and coupled to said first and second armature winding means through an electromagnetic field, the vibration caused by the movement of said first and second reflecting unit means being transmitted to said vibration reduction means through said first and second armature winding means and the magnetic field means;

driving means for driving said vibration reduction means and the magnetic field means in the opposite direction to the movement of said first and second reflecting unit means under an ideal condition in which frictional force is neglected; and electromagnetic coupling reduction means for reducing electromagnetic coupling between said first and second armature winding means and the magnetic field means.

2. The copying machine according to claim 1, wherein said vibration reduction means includes reaction force absorbing means for absorbing reaction force from said first and second reflecting unit means through the electromagnetic coupling between said first and second armature winding means and the magnetic field means to reduce said vibration caused by the movement of said first and second reflecting unit means.

3. A copying machine according to claim 1, wherein said driving means includes:

rotation power generating means for generating rotation power for moving said vibration reduction means and the magnetic field means;

reduction gear means for changing the velocity of the rotation power generated from said rotation power generating means with a predetermined velocity reduction ratio under said ideal condition, and wherein said vibration reduction means and the magnetic field means is driven by the rotation power output from said reduction gear means.

4. The copying machine according to claim 3, wherein aid driving means further includes:

positional detection means for detecting a position of said first and second refection unit means; and rotation control means responsive to a detected position of said first and second reflection unit means for controlling an output from said rotation power generating means.

5. The copying machine according to claim 4, wherein said rotation power generating means includes a pulse motor for generating rotation power, said rotation control means includes a microprocessor responsive to a positional detection signal supplied from said positional detection means for generating a driving pulse for driving said pulse motor, and said pulse motor is driven by the driving pulse generated from said microprocessor.

6. The copying machine according to claim 3, wherein said electromagnetic coupling reduction means includes velocity reduction ratio changing means for changing said predetermined velocity reduction ratio of said velocity reduction gear means by a predetermined value to reduce the electromagnetic coupling between said first and second armature winding means and the magnetic field means.

7. The copying machine according to claim 6, wherein said predetermined velocity reduction ratio is determined according to a relation between a permissible amount of vibration in said reflection unit means and the maximum rotation power when can be supplied from said rotation power generating means.

* * * * *